US010261666B2

(12) United States Patent
Kolli et al.

(10) Patent No.: US 10,261,666 B2
(45) Date of Patent: Apr. 16, 2019

(54) CONTEXT-INDEPENDENT NAVIGATION OF ELECTRONIC CONTENT

(71) Applicant: LinkedIn Corporation, Mountain View, CA (US)

(72) Inventors: Samish Chandra Kolli, Santa Clara, CA (US); Vivek Y. Tripathi, San Jose, CA (US); Aarthi Jayaram, Sunnyvale, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 326 days.

(21) Appl. No.: 15/174,900

(22) Filed: Jun. 6, 2016

(65) Prior Publication Data

US 2017/0344197 A1 Nov. 30, 2017

Related U.S. Application Data

(60) Provisional application No. 62/343,274, filed on May 31, 2016.

(51) Int. Cl.
*G06F 3/0482* (2013.01)
*G06F 3/0484* (2013.01)
*G06F 3/0488* (2013.01)

(52) U.S. Cl.
CPC ........ *G06F 3/0482* (2013.01); *G06F 3/04845* (2013.01); *G06F 3/04883* (2013.01)

(58) Field of Classification Search
CPC ............... G06F 3/0482; G06F 3/04817; G06F 3/04883; G06F 3/04845; H04N 1/00405
See application file for complete search history.

(56) References Cited

U.S. PATENT DOCUMENTS

| 2014/0189574 A1* | 7/2014 | Stallings | G06F 3/0482 715/781 |
| 2015/0370920 A1* | 12/2015 | Van Os | G06F 17/30973 707/767 |
| 2016/0378281 A1* | 12/2016 | Sirpal | G06T 11/60 715/779 |

* cited by examiner

*Primary Examiner* — Jeffrey A Gaffin
*Assistant Examiner* — Bille M Dahir
(74) *Attorney, Agent, or Firm* — Park, Vaughan, Fleming & Dowler LLP

(57) ABSTRACT

A system, method, apparatus and graphical user interface are provided for navigating a multi-component application or service—such as an application that executes on a mobile device and that includes multiple features, pages, content items, utilities, settings, etc. A shortcut bar provides rapid access to application components that correspond to multiple shortcuts, and the shortcut bar can be opened, by swiping it, to reveal a set of options associated with an open shortcut (e.g., the shortcut closest to where the user swiped on the bar). The options can be scrolled (e.g., vertically) or swiped in another direction (e.g., sideways) to access options associated with other shortcuts. The shortcut bar and the options provide set paths of navigation to desired content, without regard to the current context (e.g., the displayed content). Navigation paths to the content via the current context will vary, depending on the displayed content.

20 Claims, 9 Drawing Sheets

CONTEXT-INDEPENDENT NAVIGATION OF ELECTRONIC CONTENT

RELATED APPLICATION

This application claims priority to U.S. Provisional Patent Application No. 62/343,274, which was filed May 31, 2016 and is incorporated herein by reference.

BACKGROUND

This disclosure relates to computing and communication devices. More particularly, a system, method, apparatus, and graphical user interface are provided for facilitating navigation of electronic content displayed on a device, in a manner that is independent of the content displayed at a given time.

Many types of devices are used to access and peruse electronic content. Some of them, such as mobile devices, have limited area for displaying content, displaying controls for navigating the content, and for receiving input commands regarding navigation of the content.

Typically, a first screen or page of information is displayed and a user scrolls, pans or otherwise manipulates the device to alter the displayed information until an item of interest is shown or until the user locates and activates a link to some other information. Thus, to access a given page or set of information, the user may need to navigate through one or more previous pages using a sequence of actions that depends on what is displayed. In other words, the manner in which the user navigates the content depends on what is currently displayed, what links (if any) the displayed content includes, and where those links are displayed (e.g., which determines how much the user must scroll or pan the content in order to access the links).

DETAILED DESCRIPTION

Figure 1:
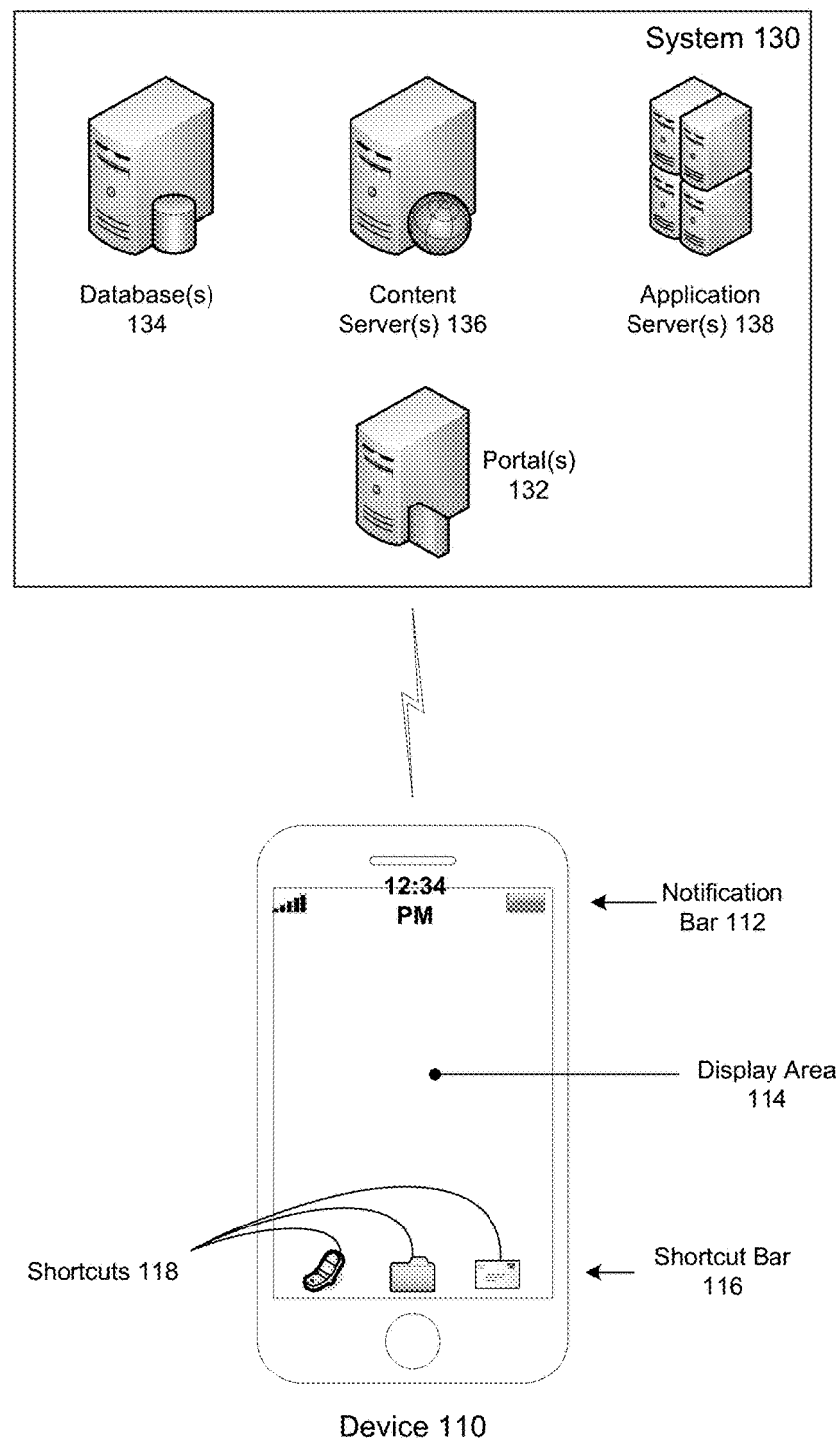
FIG. 1 is a block diagram illustrating an environment in which content may be navigated free of context, in accordance with some embodiments.

The following description is presented to enable any person skilled in the art to make and use the disclosed embodiments, and is provided in the context of one or more particular applications and their requirements. Various modifications to the disclosed embodiments will be readily apparent to those skilled in the art, and the general principles defined herein may be applied to other embodiments and applications without departing from the scope of those that are disclosed. Thus, the present invention or inventions are not intended to be limited to the embodiments shown, but rather are to be accorded the widest scope consistent with the disclosure.

In some embodiments, a system, method, apparatus, and graphical user interface are provided for enabling context-free navigation of electronic content, meaning that a navigation pattern to reach specific content is the same regardless of the content displayed at the time of navigation.

In some implementations, a shortcut bar within an operating system or application configured to execute on a mobile device (e.g., the tab bar of iOS™) is modified to function as described herein. In these implementations, the entire shortcut bar (or a discrete portion thereof) can be 'swiped' in a given direction (e.g., upward toward the top of the display) and may stick at a new location (e.g., above where it was originally displayed). While moving to the new location, and while at the new location, one or more options (e.g., shortcuts to pages or features of the operating system or application, quick links, configuration/display options, notifications, alerts) are listed. The shortcut bar may also or instead move in response to a different stimulus or input, such as a long touch, a forceful touch, etc. A shortcut bar manipulated as described herein may be considered "expandable," "extendable," "openable," etc.

When the shortcut bar includes multiple shortcuts, one of them is considered active (e.g., the one that was closest to where the shortcut bar was touched and swiped upward) and the options listed will correspond to that shortcut. Each shortcut has one or more associated options, and only one set of options (associated with one shortcut) may be presented at a time, except when transitioning from one option set and shortcut to another.

In some implementations, for example, displayed options may be scrolled in one axis (e.g., upward, downward) to show further options for the active shortcut, or in another axis (e.g., sideways) to access options for a different shortcut, in which case options of two different shortcuts may be viewed simultaneously. As the display of options is scrolled in this manner, each shortcut may become active in turn, at which time its corresponding options can be selected or activated. These options may be alternatively termed "shortcut options," "links," "deep links," "tab links," "tab options," etc.

In addition, options that are displayed when the shortcut bar moves are not limited to links. For example, the options may also (or instead) include details of a communication or notification, promotions, badges, toggle buttons (e.g., for modifying operation of the user interface), ads, and so on.

As one skilled in the art will appreciate, this method of navigating a multi-page or multi-feature application allows rapid and context-free access to many options, which may lead to specific corresponding pages, features, content items, or other components of the application. Instead of having to first click on one link or shortcut among displayed content and wait until a corresponding component is displayed, then scrolling to find a link or shortcut to another component, and repeating this process until desired content is finally displayed, the methods provided herein allow a target component that is normally several clicks/selections/links away from the currently displayed content to be opened with minimal effort.

FIG. 1 is a block diagram illustrating an environment in which content may be navigated free of context, according to some embodiments.

The environment of FIG. 1 includes device 110 and system 130, which communicate with each other via any suitable communication methods and protocols, which may depend upon the configuration of device 110. For example, a mobile device may communicate with system 130 via one or more compatible wireless protocols, directly and/or via one or more telecommunications service providers' networks, a private network, a publicly available network (e.g., the Internet), and/or other communication paths.

Device 110 is a communication device in the exemplary environment (e.g., a smart telephone), but may be some other device in other embodiments and environments, such as a tablet computer, a notebook computer, a personal digital assistant, a smartwatch, etc. Device 110 includes components such as a display, processor, antenna, radio, data storage, battery, and so on, not all of which are shown in FIG. 1.

A graphical interface of an operating system or application that executes on device 110 includes notification bar 112, which reveals information such as a current signal strength (e.g., of a wireless communication link), the current time, current status of the device's battery, and so on. The graphical interface also features a display area 114 for displaying information that may depend on a user's current operation of the device (e.g., a news story, an electronic mail message, a text message, a dialer utility), and shortcut bar 116. Shortcut bar 116 includes shortcuts 118 for quickly initiating actions such as making a telephone call, opening stored content, accessing an electronic mail program, etc. Notification bar 112 and/or shortcut bar 116 may be understood to occupy portions of display area 114.

System 130 is operated by or on behalf of an organization that provides an online application or service to many users, including the user of device 110. System 130 comprises (or is part of) a data center or other cooperative collection of resources for supporting the application (or service). In some implementations, the application is a social network or a professional network such as the community of professionals hosted by LinkedIn® Corporation.

In the environment of FIG. 1, system 130 includes portal 132 through which device 110 accesses the application, obtains content to be displayed to the user, delivers user input (e.g., commands, clicks, messages). The system also includes one or more databases 134, content servers 136, and application servers 138. These components of system 130, and/or others, support the operation of the application on device 110. In other environments, system 130 may include a subset of the illustrated components, or a superset.

The application hosted or supported by system 130 includes multiple features, pages, content, utilities, and so on, which may be collectively termed 'components' or 'aspects' of the application. For example, when a typical user of the application opens the program, he or she may view a landing page or initial content that includes any number of frames, links (to other pages, features, and/or items), content items, and/or other components. Any of these components, when selected, may lead to additional components and/or offer further options to navigate the application.

In embodiments in which the application is a professional network or a social network, the application may offer a great number of components to users (e.g., members of the network). While a user is free to navigate the application contextually, meaning that the user views information shown in display area 114 and uses links embedded in that information to navigate to other application components and content, shortcuts to specific components or aspects, such as shortcuts 118, can expedite the user's access. Embodiments suitable for use with an extensive application (such as a professional network) are now described in conjunction with FIGS. 2A-2F, and provide context-free navigation of the application, meaning that the shortcuts and their associated options provide rapid access to selected components in a set manner, regardless of the content displayed in display area 114.

FIGS. 2A-2F are screenshots of an electronic device as it is used to navigate an application independently of the displayed content, in accordance with some embodiments.

Figure 2A:
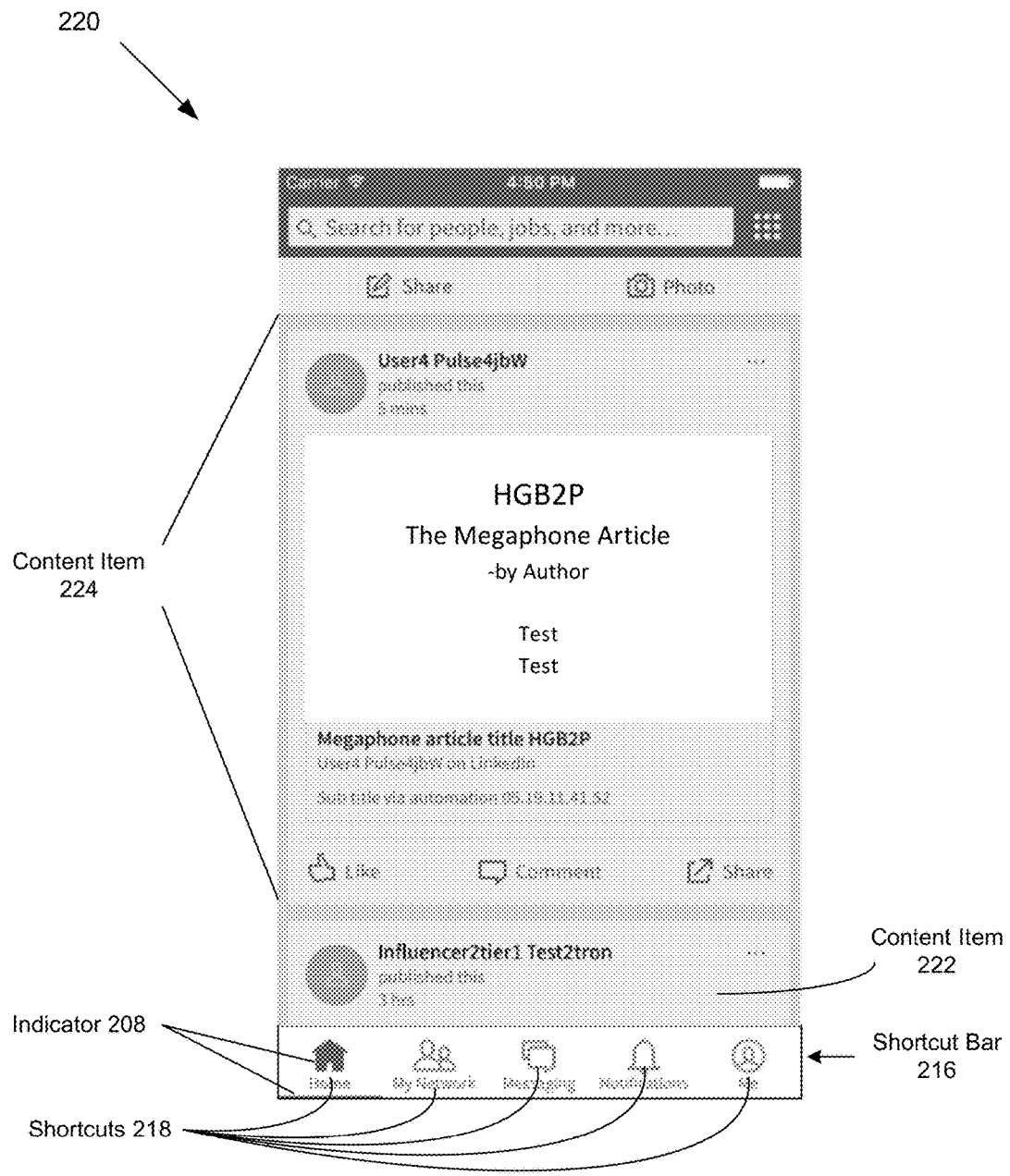
FIGS. 2A-2F are screenshots of an electronic device as it is used to navigate content independently of context, in accordance with some embodiments.

FIG. 2A shows screenshot 220 of the application, which currently displays a home page that the user of the device receives or views when the application is opened. The home page for this application provides a search tool, links for sharing content (e.g., a post, an article, a news story) or taking a photograph, and a display of one or more content items that the user may be interested in, including items 222 and 224. Among other possible interaction the user may have with the home page of view 220, he or she may scroll (e.g., vertically) through the content items to find and enjoy interesting information.

The application also, however, includes shortcut bar 216 that has been customized for the application. In other words, the application does not employ a default shortcut bar that may be offered by the device's operating system or as part of a programming environment for developing applications for the device. Because the shortcut bar was created or customized for the application, it is not limited to the minimal functionality associated with traditional shortcut bars.

Shortcut bar 216 includes multiple shortcuts 218 for the professional networking application, which illustratively correspond to the "Home" page currently displayed, a "My Network" feature of the application, a "Messaging" component, a "Notifications" page, and a "Me" component. The My Network component may relate to the user's connections within the professional network (e.g., creation of a connection, updates from connections), the Messaging feature may enable the user to create and/or view communications (e.g., instant messages, electronic mail) with connections and/or other entities, the Notifications component may comprise any number of notifications to the user (e.g., from the provider of the professional network), and the Me page may allow the user to view/edit his or her network profile and/or take other action regarding the user's presence within the community.

Indicator 208 provides a clear indication of which shortcut is currently active—in other words, the shortcut that comprises or relates to the information currently displayed. In this example, the indicator includes a line under the active shortcut and highlighting of the shortcut (i.e., by filling in the shortcut's icon, as opposed to the unfilled nature of the inactive shortcuts). Traditional shortcut bars have no such indicator because they cannot be manipulated in a manner similar to shortcut bar 216.

Figure 2B:
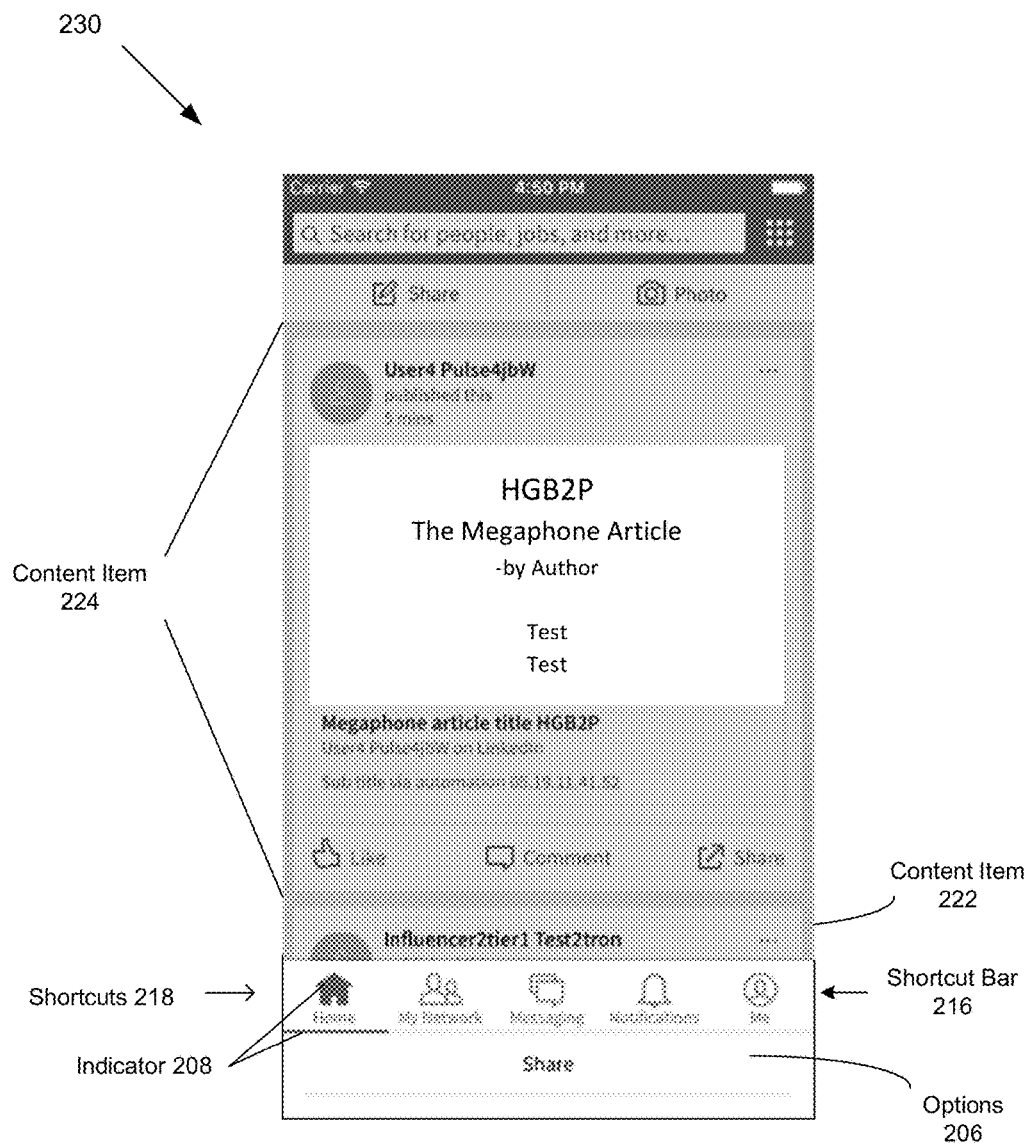

FIG. 2B shows screenshot 230 of the application, which results from starting to swipe upward on shortcut bar 216 or taking some other action that will open the bar (e.g., a long touch on or near a shortcut). As shown, a set of options 206 begins to appear below the shortcut bar. In this example, the shortcut bar has not fully transitioned to its final offset position, which is shown in the following screenshot.

In the illustrated embodiments, the user swiped upward with a suitable tool (e.g., his or her finger), while the tool was positioned on or near the "Home" shortcut. Therefore, indicator 208 continues to highlight that shortcut and options 206 will relate to the Home component of the application.

In some implementations, as the shortcut bar is swiped upward it overlays the displayed content (i.e., content item 222 in FIG. 2B). In some other implementations, the displayed content may scroll upward in unison with the shortcut bar.

Figure 2C:
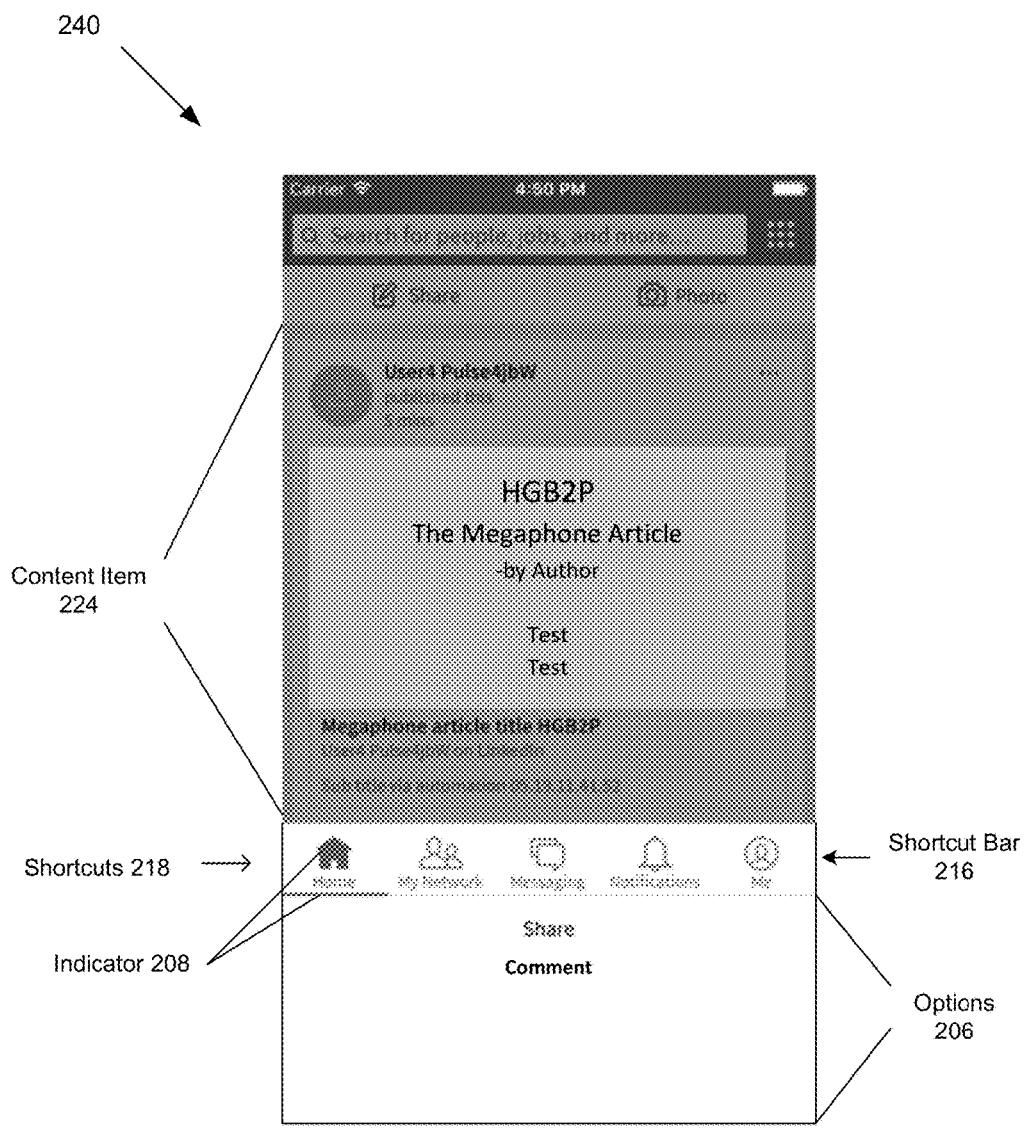

FIG. 2C shows screenshot 240 of the application, which illustrates shortcut bar 216 and shortcuts 218 having transitioned to their new offset position. The area in which options 206 are displayed is now open to its full extent, which may accommodate different numbers of options in different implementations, depending on factors such as font, font size, the number of characters in an option, whether only one option or multiple options are listed on a single line, whether an option includes a graphical element (e.g., a logo, a badge, an icon, a special character), how many components or sub-components exist for or are associated with a given shortcut, etc. Thus, although only two options are shown in view 240, and do not fully occupy the space for options 206, in other embodiments and for other shortcuts, more or fewer options may be listed, and/or the portion of the display area allocated for options may differ.

It may be noted that content item 224 and/or other portions of the display area are now opaque, or more opaque than they were before shortcut bar 216 transitioned to its new position. In other embodiments, this effect may not occur, or may disappear if the user touches on content item 224 or some other portion of the display not associated with shortcut bar 216 or options 206, at which time the shortcut bar may return to its original or normal position at the bottom of the display area.

Options 206 may include links, triggers, settings, notifications and/or other things associated with the active shortcut and/or the displayed information or content (i.e., content item 224 in FIG. 2C), and/or other options (e.g., settings that affect the entire application). Illustratively, some or all content items in the Home area of the application may be subject to Share and/or Comment actions by the user, which the user may initiate using options 206 or links in the displayed content, but options 206 may also include other options that are not provided in the displayed information and/or that are normally only accessible by navigating through the displayed information to other components or subcomponents. This will be seen more clearly in other screenshots.

Figure 2D:
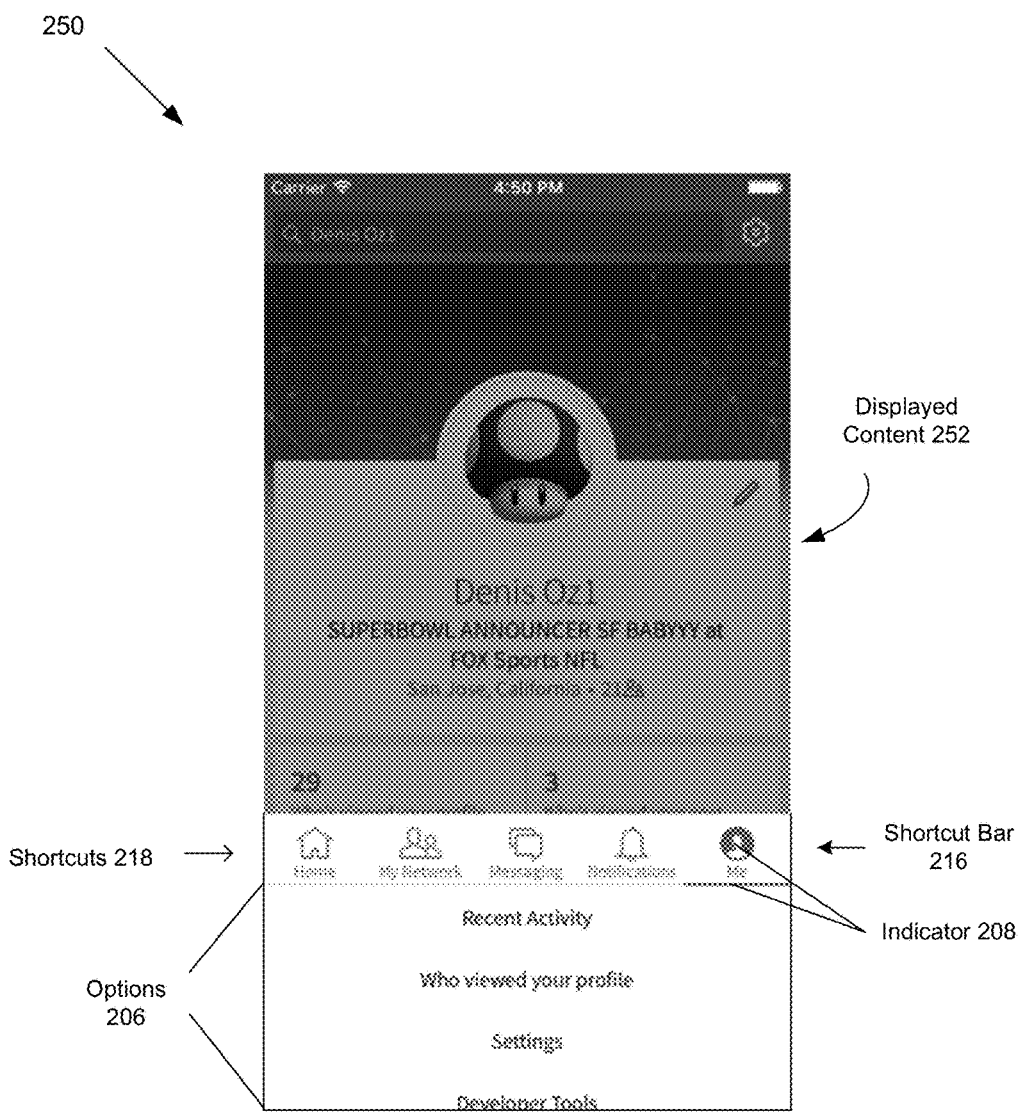

FIG. 2D shows screenshot 250 of the application, which results from selection of a different shortcut by the user—the shortcut for the Me component of the application. The area for options 206 remains open to its full extent, and now includes at least four options, which may be scrolled (e.g., vertically) to reveal even more (if more options exist for the active shortcut).

In the illustrated embodiments, upon selection of a different shortcut while options area 206 is open, the displayed content/information changes to show the top-level page or content that corresponds to the selected shortcut (i.e., displayed content 252) or the corresponding component or subcomponent that was last viewed by the user (e.g., the last time the user navigated to or within the Me feature). The content is opaque because the shortcut bar is open. When the different shortcut was selected, indicator 208 automatically changed to highlight the shortcut that is now active.

Options area 206 of FIG. 2D reveals that the application components associated with the Me feature include 'Recent Activity' (e.g., the user's recent activity with the application), 'Who viewed your profile' (e.g., indications or identifications regarding who has viewed the user's profile within the professional network), 'Settings,' and 'Developer Tools' (assuming the user is a developer). Having these and/or other options or links readily available to the user saves him or her the time and effort of having to navigate displayed content 252 to reach a desired component, via various links that are different from one page to another.

Figure 2E:
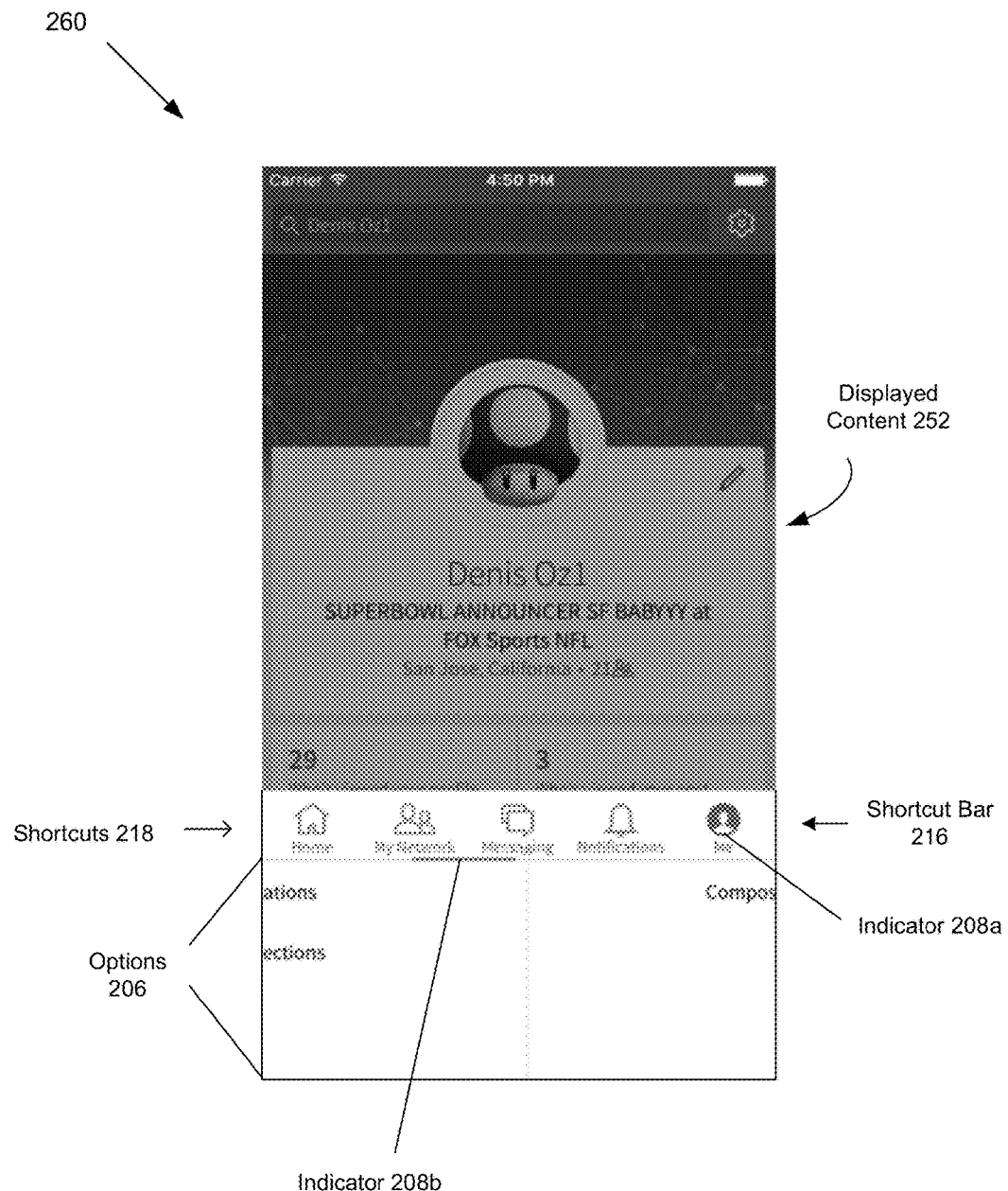

FIG. 2E shows screenshot 260, wherein the user is swiping (horizontally) among options associated with different shortcuts. During such action, indicator 208 reveals multiple aspects: indicator 208a (highlighting, shading, or coloring) identifies the active shortcut corresponding to displayed content 252, while indicator 208b (a horizontal bar) identifies which shortcut's (or shortcuts') options are currently shown in options area 206.

In particular, screenshot 260 reflects the application display as the user swipes options 206 from one shortcut (and its corresponding options) to another shortcut (and its corresponding options). The user either is swiping from the shortcut options associated with the Messaging feature to the shortcut options associated with the My Network component, or is swiping in the opposite direction.

In some alternative embodiments, swiping options 206 horizontally causes the displayed content to change along with the displayed options. As opposed to screenshot 260, wherein the shortcut associated with the Me feature remains active and the displayed content is content associated with that feature while options for different shortcuts are swiped, in these embodiments the active shortcut transitions with the user's swiping action and as the display scrolls from one shortcut's options to another's, the displayed content changes to content corresponding to the displayed options' associated shortcut. In these embodiments, illustrated in FIG. 2F, the indicators may change in unison or remain bifurcated, wherein one (indicator 208a) identifies the shortcut now considered "inactive," while the other (indicator 208b) identifies the shortcut whose options are open and displayed in options area 206.

Figure 2F:
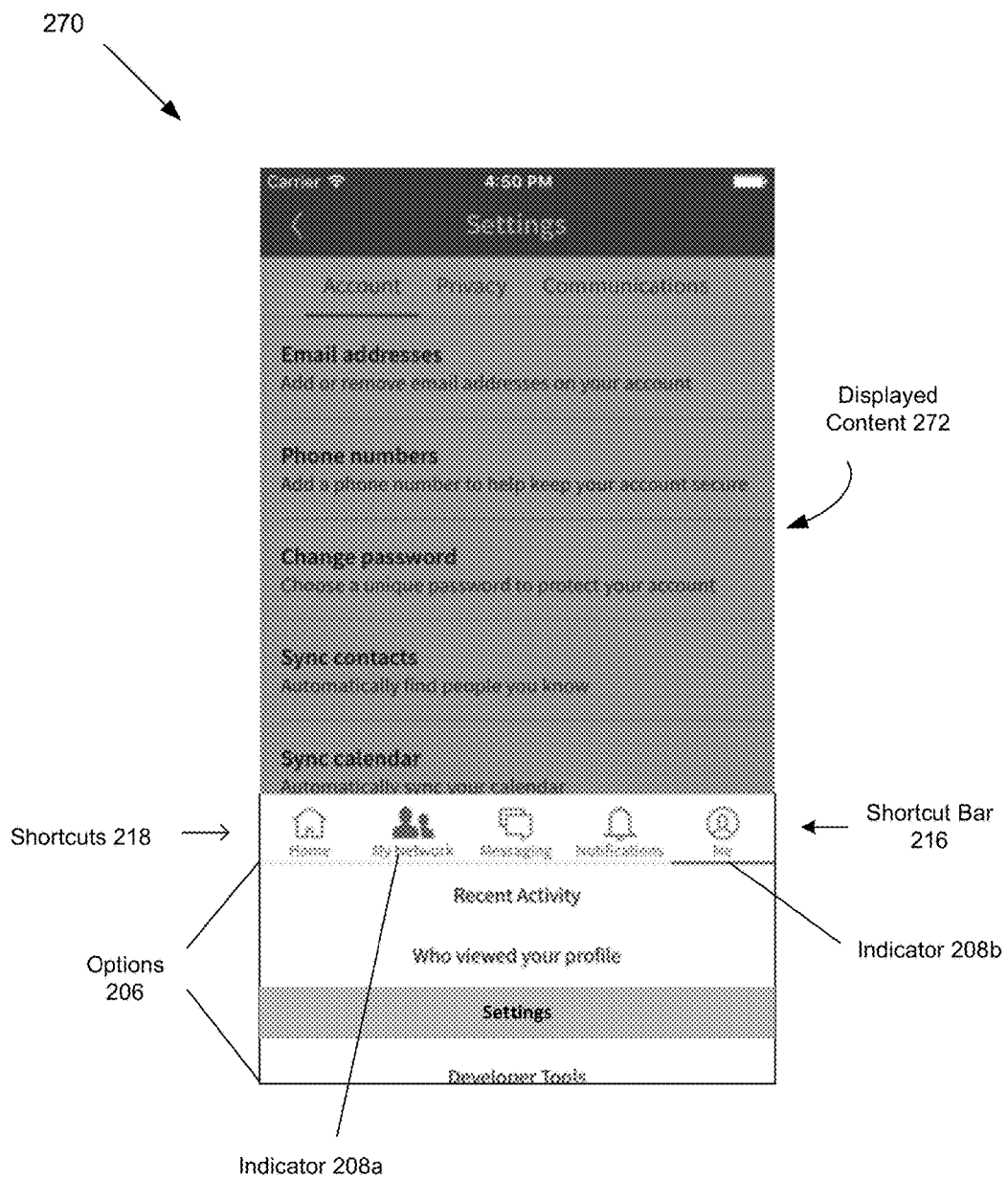

Specifically, FIG. 2F shows screenshot 270, which reveals that the user of the device selected the shortcut associated with the My Network feature of the application (e.g., after the application state reflected in screenshot 260 of FIG. 2E), which caused indicator 208a to highlight the My Network shortcut and the displayed content 272 to be content associated with the My Network component of the application (not shown in FIG. 2F). Then, the user further manipulated or swiped options area 206 until the options associated with the Me shortcut were again displayed, as indicated by indicator 208b.

Thus, the shortcut highlighted with indicator 208a in screenshot 270 is considered inactive in these embodiments, as opposed to being active in embodiments discussed above. While it does not correspond to the displayed content, it provides a reminder to the user regarding what he or she was viewing before swiping options 206 among the different shortcuts. Illustratively, if the user releases (stops touching) the display without selecting an option, the display may return to the content corresponding to the inactive shortcut. Alternatively, it may show content corresponding to the last shortcut whose options were displayed when the user released the display.

In screenshot 270 of FIG. 2F, displayed content 272 corresponds to the 'Settings' option of the Me shortcut, and may be displayed for multiple reasons. For example, the 'Settings' option may be selected among options 206 while swiping among shortcut options (e.g., as shown in FIG. 2F), or the Settings page may currently be the active page of the Me component of the application, and when the user swiped the options area to the Me shortcut, that active page was the content that was displayed.

This reflects the dual navigation capabilities of the application navigation provided herein. First, a user may employ a context-dependent method of navigation by navigating the application via controls (e.g., links, menus) rendered as part of the displayed content. When the user transitions or moves from a first component of the application to a second (e.g., from My Network to Me), either using a shortcut or some other link(s), the status of the first is retained (i.e., to identify the content that was displayed before the transition), and the saved status of the second (if there is any saved state) determines which content to display after the transition. Second, a context-free method of navigation is conducted by manipulating shortcuts 218 and options 206, as described above, which allows direct access to an application feature or content that would otherwise require multiple hops (e.g., clicks, taps).

When navigating within the context of the displayed content, the path to reach a particular destination depends on the displayed content (e.g., which links are offered) and, if a transition to a different component is initiated (e.g., by selecting a shortcut or link), the saved state of that destination component is used to identify and populate the display area. In contrast, when navigating via shortcut options 206 the same sequence of operations will always lead to the same destination, regardless of displayed content and/or context states that have been saved for different components of the application.

This allows a user to quickly access a particular feature, regardless of how "deep" it is within the application, with minimal manipulation of the application interface. Accessibility may be designed into the application so that when the input options (e.g., shortcuts, shortcut options) are read aloud, for example, the user can still quickly (and repeatedly) reach a desired destination with a single command or input.

In some embodiments, shortcuts and/or shortcut options (e.g., shortcuts 218 and/or options 206 of FIGS. 2A-2F) can be customized by a user. For example, a user may prefer to have one or more specific options shown (or not shown) for a particular shortcut, in addition to or instead of default options provided by the application. An example of such an option is the 'Settings' option shown in screenshot 270 of FIG. 2F for the Me component of the application. The corresponding settings include some that affect the entire application, not just the Me feature.

The default options for a given shortcut, which are shown for that shortcut in options area 206 unless and until a user customizes them, or the provider of the application changes them, may be chosen or selected based on various factors. For example, the default options may be those that are used most often or that are most popular, among all users or a subset of users matching some characteristic(s). Illustratively, some or all users may be categorized based on their express or implied reasons or goals for using the application. For a professional network application, such categories may include 'job seeker,' 'recruiter,' 'sales professional,' 'student,' 'professor,' 'influencer,' and so on. For each category, different or overlapping sets of default options may be provided to users matching that category.

As another example, default options may include those that save users the most effort. Thus, content that would require several clicks, taps, or other user actions to reach may have a corresponding option included in the options area for the shortcut associated with the feature or page that includes the content.

As yet another example, the default options for a given shortcut may correspond to the most significant links, content or other components that are accessible via that shortcut. Therefore, if the shortcut is to an application component that has several subcomponents (e.g., pages, content items, feeds, frames, utilities), the default options may provide quick access to the most prominent subcomponents, the ones that have the most sub-subcomponents, the ones that have been updated most recently or frequently, etc. Thus, in different embodiments, any or all of the application subcomponents accessible via the application component corresponding to a given shortcut may be represented by options that appear when the shortcut bar is open to that shortcut.

The application may also, or instead, learn the content that a user accesses frequently and either automatically add an option (or change an existing option) to facilitate access to that content, or offer to create an option and allow the user to decide.

The options area for some or all shortcuts may be used in some implementations to inform a user of a new component of the application. For example, when the user opens the options for a particular shortcut by swiping upward on the shortcut bar, he or she may be presented with an option that includes a badge, symbol, icon, formatting (e.g., color, bold, font), or other characteristic that indicates the option is new.

Figure 3:
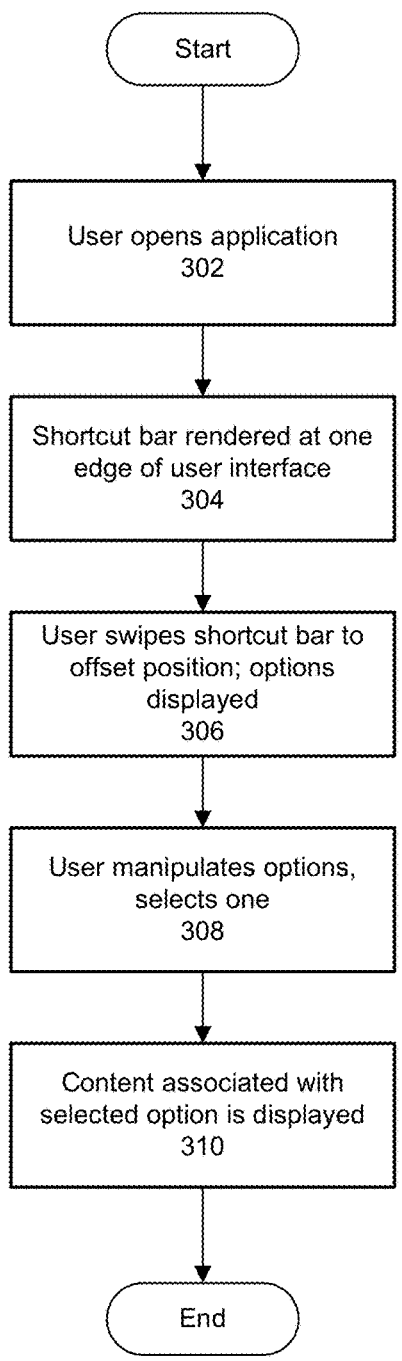
FIG. 3 is a flow chart illustrating a method of navigating content context-free, in accordance with some embodiments.

FIG. 3 is a flow chart illustrating a method of context-free navigation of an application, according to some embodiments. In one or more of these embodiments, one or more of the steps may be omitted, repeated, and/or performed in a different order. Accordingly, the specific arrangement of operations or steps shown in FIG. 3 should not be construed as limiting the scope of the embodiments.

In operation 302 a user opens the application on a device such as a smart phone, tablet computer, smart watch, or other mobile device. The manner in which the application is opened may be the same for the application as for other programs accessible via an operating system interface of the device (e.g., by clicking or tapping on an associated icon).

In operation 304, as part of the landing page, home page, or other initial set of content displayed on the device when the application opens, a shortcut bar featuring multiple shortcuts is rendered at one edge (e.g., the bottom) of the application interface. The application's graphical user interface may occupy most or all of the usable area of the display component of the device, and the shortcut bar may remain in the interface most of the time or all of the time the application is open. Unless opened as indicated below, the shortcut bar may remain in the same location in which it initially appears.

In operation 306, the user swipes on the shortcut bar, moving it from its normal or default position to a new location. If the user releases the shortcut bar before it reaches the new location, it may snap to the normal location or the new location, depending on how far (and fast) it was swiped, for example.

As the shortcut bar opens, one or more options are displayed (e.g., below the shortcut bar if the bar is swiped upward). The options displayed may include links associated with the application component (e.g., feature, page, content, utility) that corresponds to the shortcut closest to the point where the user's tool (e.g., finger) contacted the user interface, and/or may include global options (e.g., settings, preferences) that affect multiple or all aspects of the application. The shortcut for which options are displayed may be termed the "open" shortcut.

In operation 308, the user manipulates the options as desired and then selects one. Illustratively, he or she may swipe the options in one direction (e.g., vertically) to see all options provided for the open shortcut, and in another direction (e.g., horizontally) to view options associated with a different shortcut. In the latter case, one or more indicators are provided to identify the open shortcut, the active shortcut (e.g., the shortcut for which corresponding content is currently displayed), an inactive shortcut (e.g., the last shortcut that was active).

In some embodiments, as the user swipes between sets of options associated with different shortcuts, displayed content changes. For example, each time the user swipes a different set of options into view, a first or initial page or item of content associated with the corresponding shortcut may be displayed. Or, different states or statuses may be retained for each shortcut to identify the last application component (e.g., feature, page, content item, utility, setting) associated with the shortcut that the user navigated to. One of these components may be what is displayed as the user swipes between sets of options associated with different shortcuts.

In operation 310, upon selection of one shortcut option, corresponding content is opened in the display (e.g., above the shortcut bar), and the associated shortcut may become active. The shortcut bar may then automatically return to its normal position, or may return after a default period of time (e.g., one second). The displayed content may be a specific application feature or page, a content item, a collection of content (e.g., a news feed, updates related to the user's connections), a utility (e.g., for sending/receiving electronic mail or instant messages), an interface for adjusting the user's application settings, or some other component of the application.

Figure 4:
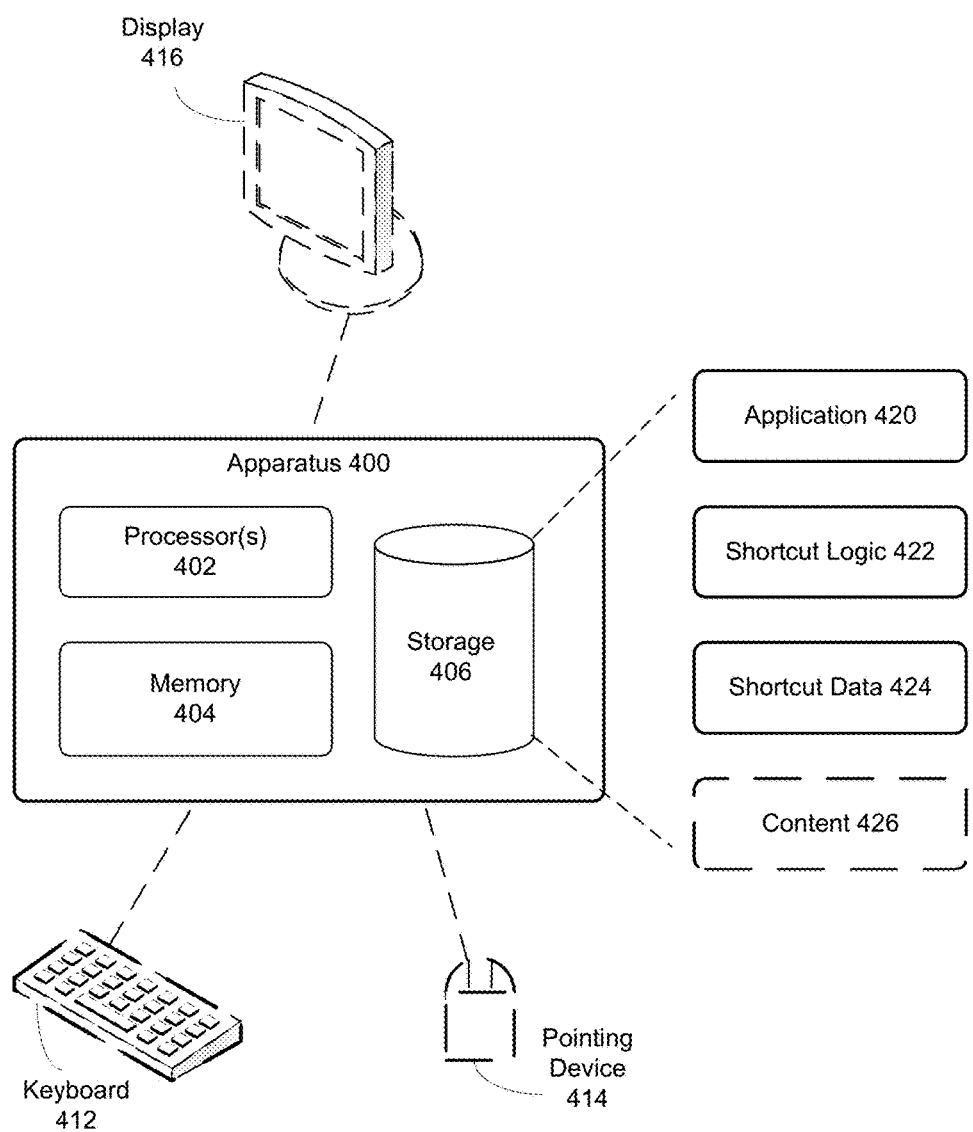
FIG. 4 depicts an apparatus for navigating content context-free, in accordance with some embodiments.

FIG. 4 depicts an apparatus for context-free navigation of an application, according to some embodiments. The application may support a professional network or other network that hosts an online community of users.

Apparatus 400 of FIG. 4 includes processor(s) 402, memory 404, and storage 406, which may comprise any number of solid-state, magnetic, optical, and/or other types of storage components or devices. Storage 406 may be local to or remote from the apparatus. Apparatus 400 can be coupled (permanently or temporarily) to keyboard 412, pointing device 414, and display 416.

Storage 406 stores logic and/or logic modules that may be loaded into memory 404 for execution by processor(s) 402, including application logic 420 and shortcut logic 422. In other embodiments, these logic modules may be aggregated or divided to combine or separate functionality as desired or as appropriate. For example, shortcut logic 422 may be implemented as part of application 420.

Application logic 420 comprises processor-executable instructions for operating an application or service, such as a professional networking application, that includes multiple pages, features, content items, utilities, and/or other components. A user of apparatus 400 may use the application to consume content, send and/or receive communications, share content with other users, etc.

Shortcut logic 422 comprises processor-executable instructions for configuring and operating a shortcut bar to facilitate access to different components of the application in a context-free manner. The logic controls the appearance and presentation of a shortcut bar comprising multiple shortcuts, each of which corresponds to a particular feature or other component of the application that has any number of subcomponents. For example, different shortcuts may correspond to different features or pages of a website associated with the application, and each such feature or page may have links to subcomponents of the application (e.g., features, pages, content items).

When a user opens or manipulates the shortcut bar by touching it on or near one shortcut and swiping it toward a different position from its initial position, options (e.g., links) associated with the one shortcut are displayed and can be selected to immediately navigate the displayed content to the corresponding application component or subcomponent. Options associated with different shortcuts can be accessed by swiping on them on a different direction (e.g., a direction orthogonal to the direction in which the shortcut bar was opened).

Storage 406 may also store data such as shortcut data 424, which may identify custom settings for a user. Illustratively, the user may have specified that a certain option should always be offered for a particular shortcut; may change the order of display of options for one or more shortcuts; may change the font, font size, or other display characteristic for shortcut options; etc. In different embodiments, configuration and/or customization options may be stored on apparatus 400 (e.g., in storage 406), at a remote system that hosts the application, or at both locations.

Storage 406 may optionally store content 426, such as content items presented to the user by the application, content offered for presentation to the user, and/or other content.

Logic stored in storage 406 may in some implementations be referred to as modules, and each module may be considered to comprise a portion of computer-readable media that stores the instructions that comprise the logic.

An environment in which one or more embodiments described above are executed may incorporate a data center, a general-purpose computer or a special-purpose device such as a hand-held computer or communication device that may correspond to apparatus 400. Some details of such devices (e.g., processor, memory, data storage, display) may have been omitted for the sake of clarity. A component such as a processor or memory to which one or more tasks or functions are attributed may be a general component temporarily configured to perform the specified task or function, or may be a specific component manufactured to perform the task or function. The term "processor" as used herein refers to one or more electronic circuits, devices, chips, processing cores and/or other components configured to process data and/or computer program code.

Data structures and program code described in this detailed description are typically stored on a non-transitory computer-readable storage medium, which may be any device or medium that can store code and/or data for use by a computer system. Non-transitory computer-readable storage media include, but are not limited to, volatile memory; non-volatile memory; electrical, magnetic, and optical storage devices such as disk drives, magnetic tape, CDs (compact discs) and DVDs (digital versatile discs or digital video discs), solid-state drives, and/or other non-transitory computer-readable media now known or later developed.

Methods and processes described in the detailed description can be embodied as code and/or data, which may be stored in a non-transitory computer-readable storage medium as described above. When a processor or computer system reads and executes the code and manipulates the data stored on the medium, the processor or computer system performs the methods and processes embodied as code and data structures and stored within the medium.

Furthermore, the methods and processes may be programmed into hardware modules such as, but not limited to, application-specific integrated circuit (ASIC) chips, field-programmable gate arrays (FPGAs), and other programmable-logic devices now known or hereafter developed. When such a hardware module is activated, it performs the methods and processed included within the module.

The foregoing embodiments have been presented for purposes of illustration and description only. They are not intended to be exhaustive or to limit this disclosure to the forms disclosed. Accordingly, many modifications and variations will be apparent to practitioners skilled in the art. The scope is defined by the appended claims, not the preceding disclosure.

What is claimed is:

1. A method of facilitating a user's navigation of a multi-component application on an electronic device having a touch-screen display, the method comprising:
    displaying at a first position a shortcut bar comprising multiple shortcuts, wherein each shortcut corresponds to a different component of the application;
    in response to the user swiping the shortcut bar in a first direction while touching the display proximate to a first shortcut:
        moving the shortcut bar from the first position to a new position offset from the first position; and
        displaying a first set of options associated with the first shortcut;
    receiving the user's selection of a first option associated with the first shortcut; and
    displaying content corresponding to the first option.

2. The method of claim 1, further comprising, after the first set of options is displayed:
    moving the first set of options in a second direction, and off the display, in response to the user's swiping of the first set of options in the second direction; and
    simultaneous with said moving of the first set of options, moving onto the display a second set of options associated with a second shortcut.

3. The method of claim 2, further comprising:
    moving, in the second direction, a first indicator that indicated the first shortcut while the first set of options was displayed, until the first indicator indicates the second shortcut.

4. The method of claim 3, further comprising:
    displaying content corresponding to the first shortcut when the shortcut bar is displayed; and
    indicating the first shortcut with a second indicator as long as content corresponding to the first shortcut is displayed.

5. The method of claim 3, further comprising:
    displaying content corresponding to the first shortcut when the shortcut bar is displayed;
    indicating the first shortcut with a second indicator while content corresponding to the first shortcut is displayed;
    displaying content corresponding to the second shortcut when the first set of options is moved off the display; and
    indicating the second shortcut with the second indicator when the content corresponding to the second shortcut is displayed.

6. The method of claim 1, further comprising, prior to the user swiping the shortcut bar:
    displaying initial content of an initial component of the application that corresponds to an initial shortcut;
    wherein the initial content and the shortcut bar are displayed simultaneously;
    wherein a first path of navigation exists to desired content of the user, through activation of multiple links on multiple pages of the application, starting with the displayed content, without using the shortcut bar; and
    wherein a second path of navigation exists to the desired content by a single activation of an option associated with a shortcut that corresponds to a component of the application that comprises the desired content.

7. The method of claim 6, wherein:
    the first path of navigation changes when different content is displayed with the shortcut bar; and
    the second path of navigation does not change when different content is displayed with the shortcut bar.

8. The method of claim 1, further comprising, prior to the user swiping the shortcut bar:
    displaying an initial component of the application in a first area of the display, wherein the shortcut bar is displayed in a second area of the display;
    wherein moving the shortcut bar involves sliding the shortcut bar over a portion of the initial component.

9. An apparatus, comprising:
    one or more processors; and
    memory storing instructions that, when executed by the one or more processors, cause the apparatus to:
        display at a first position a shortcut bar comprising multiple shortcuts, wherein each shortcut corresponds to a different component of the application;
        in response to the user swiping the shortcut bar in a first direction while touching the display proximate to a first shortcut:
            move the shortcut bar from the first position to a new position offset from the first position; and
            display a first set of options associated with the first shortcut;
        receive the user's selection of a first option associated with the first shortcut; and
        display content corresponding to the first option.

10. The apparatus of claim 9, wherein the memory further stores instructions that, when executed by the one or more processors, cause the apparatus to, after the first set of options is displayed:
    move the first set of options in a second direction, and off the display, in response to the user's swiping of the first set of options in the second direction; and
    simultaneous with said moving of the first set of options, move onto the display a second set of options associated with a second shortcut.

11. The apparatus of claim 10, wherein the memory further stores instructions that, when executed by the one or more processors, cause the apparatus to:
    move, in the second direction, a first indicator that indicated the first shortcut while the first set of options was displayed, until the first indicator indicates the second shortcut.

12. The apparatus of claim 11, wherein the memory further stores instructions that, when executed by the one or more processors, cause the apparatus to:
    display content corresponding to the first shortcut when the shortcut bar is displayed; and
    indicate the first shortcut with a second indicator as long as content corresponding to the first shortcut is displayed.

13. The apparatus of claim 11, wherein the memory further stores instructions that, when executed by the one or more processors, cause the apparatus to:
    display content corresponding to the first shortcut when the shortcut bar is displayed;
    indicate the first shortcut with a second indicator while content corresponding to the first shortcut is displayed;
    display content corresponding to the second shortcut when the first set of options is moved off the display; and indicate the second shortcut with the second indicator when the content corresponding to the second shortcut is displayed.

14. The apparatus of claim 9, wherein the memory further stores instructions that, when executed by the one or more processors, cause the apparatus to, prior to the user swiping the shortcut bar:
display initial content of an initial component of the application that corresponds to an initial shortcut;
wherein the initial content and the shortcut bar are displayed simultaneously;
wherein a first path of navigation exists to desired content of the user, through activation of multiple links on multiple pages of the application, starting with the displayed content, without using the shortcut bar; and
wherein a second path of navigation exists to the desired content by a single activation of an option associated with a shortcut that corresponds to a component of the application that comprises the desired content.

15. The apparatus of claim 14, wherein:
the first path of navigation changes when different content is displayed with the shortcut bar; and
the second path of navigation does not change when different content is displayed with the shortcut bar.

16. The apparatus of claim 9, wherein the memory further stores instructions that, when executed by the one or more processors, cause the apparatus to, prior to the user swiping the shortcut bar:
display an initial component of the application in a first area of the display, wherein the shortcut bar is displayed in a second area of the display;
wherein moving the shortcut bar involves sliding the shortcut bar over a portion of the initial component.

17. A portable electronic device having a touch-screen display and a graphical user interface, the graphical user interface comprising:
a shortcut bar comprising multiple shortcuts to different components of a multi-component application executed on the device, wherein the shortcut bar occupies an initial position in a first area of the display; and
a second area of the display that displays content of the multi-component application;
wherein:
in response to a user of the device swiping the shortcut bar in a first direction while touching the display proximate to a first shortcut:
the shortcut bar is moved from the initial position to a new position offset from the initial position and overlaying a first portion of the second area of the display; and
a first set of options associated with the first shortcut is displayed in a third area of the display that comprises the first area and a second portion of the second area of the display; and
upon selection by the user of a first option associated with the first shortcut, content corresponding to the first option is displayed in the second area.

18. The portable electronic device of claim 17, wherein, after the first set of options is displayed:
the first set of options moves in a second direction, and off the display, in response to the user's swiping of the first set of options in the second direction;
simultaneous with said moving of the first set of options, a second set of options associated with a second shortcut moves onto the display; and
a first indicator that indicated the first shortcut while the first set of options was displayed is moved in the second direction, until the first indicator indicates the second shortcut.

19. The portable electronic device of claim 17, wherein, prior to the user swiping the shortcut bar:
initial content of an initial component of the application that corresponds to an initial shortcut is displayed in the second area;
the initial content and the shortcut bar are displayed simultaneously;
a first path of navigation exists to desired content of the user, through activation of multiple links on multiple pages of the application, starting with the displayed content, without using the shortcut bar; and
a second path of navigation exists to the desired content by a single activation of an option associated with a shortcut that corresponds to a component of the application that comprises the desired content.

20. The method of claim 1, wherein the first set of options includes at least one option that is associated only with the first shortcut and not with any other shortcut in the multiple shortcuts.

* * * * *